United States Patent
Hakim

(10) Patent No.: US 12,212,572 B2
(45) Date of Patent: Jan. 28, 2025

(54) DIFFERENTIATED AUTHORIZATION FOR DOMAINS OF A MULTI-DOMAIN APPLICATION

(71) Applicant: Capital One Services, LLC, McLean, VA (US)

(72) Inventor: Syed Sameer Hakim, Dublin, CA (US)

(73) Assignee: Capital One Services, LLC, McLean, VA (US)

( * ) Notice: Subject to any disclaimer, the term of this patent is extended or adjusted under 35 U.S.C. 154(b) by 170 days.

(21) Appl. No.: 17/993,366

(22) Filed: Nov. 23, 2022

(65) Prior Publication Data

US 2024/0171580 A1 May 23, 2024

(51) Int. Cl.
*G06F 21/30* (2013.01)
*H04L 9/40* (2022.01)

(52) U.S. Cl.
CPC ........ *H04L 63/101* (2013.01); *H04L 63/0815* (2013.01); *H04L 63/0876* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 9,536,107 B2 | 1/2017 | Soman et al. | |
| 9,965,523 B2 | 5/2018 | Votaw et al. | |
| 10,505,733 B2 | 12/2019 | Rowe et al. | |
| 10,958,653 B1 | 3/2021 | Miller et al. | |
| 11,089,028 B1 | 8/2021 | Alpaugh et al. | |
| 2007/0136603 A1* | 6/2007 | Kuecuekyan | H04L 63/0884 713/185 |
| 2007/0289006 A1* | 12/2007 | Ramachandran | H04L 63/08 726/10 |
| 2014/0250533 A1* | 9/2014 | Basavapatna | H04L 63/1416 726/25 |
| 2017/0293763 A1* | 10/2017 | Shear | G06F 21/316 |
| 2021/0377272 A1* | 12/2021 | Dasari | H04L 63/20 |
| 2021/0385210 A1* | 12/2021 | Olden | H04L 63/0892 |
| 2021/0392132 A1* | 12/2021 | Olden | H04L 67/1095 |

* cited by examiner

*Primary Examiner* — Christopher B Robinson
(74) *Attorney, Agent, or Firm* — Sterne, Kessler, Goldstein & Fox P.L.L.C.

(57) ABSTRACT

Disclosed herein are system, method, and computer program product embodiments for differentiated authorization for domains of a multi-domain application. A computing device may identify a familiarity indicator based on identity information received with a request for access to a multi-domain application. Based on a risk assessment of the familiarity indicator, an access level for the access to the multi-domain application may be identified. A request for an access token that enables access to a first domain of the multi-domain application may be authorized based on the access level. A request for an access token that enables access to a second domain, such as a domain associated with a higher access level than the first domain of the multi-domain application, may be denied based on the access level.

20 Claims, 3 Drawing Sheets

DIFFERENTIATED AUTHORIZATION FOR DOMAINS OF A MULTI-DOMAIN APPLICATION

BACKGROUND

Conventionally, when a user device is authenticated by a system (e.g., a multi-domain application, a business platform, an integrated application, etc.), the user device receives an authorization token authorized at a level that is equivalent to certain resources within the system, such as data/information, application programming interfaces (APIs), functions, resources, and/or the like. Conventionally, the authorization token is not differentiated according to domains (e.g., authorization domains, etc.). Consequently, an authorization token authorized at a given level (e.g., level 3, etc.) may be valid across multiple domains (e.g., electronic banking domains, digital wallet and/or card management domains, financial technology-related domains, etc.). Linearity of usage of the same authorization token across all domains causes excessive permissions to be enabled with system authorization and/or limits the ability to implement least privilege permissions as part of system authorization.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
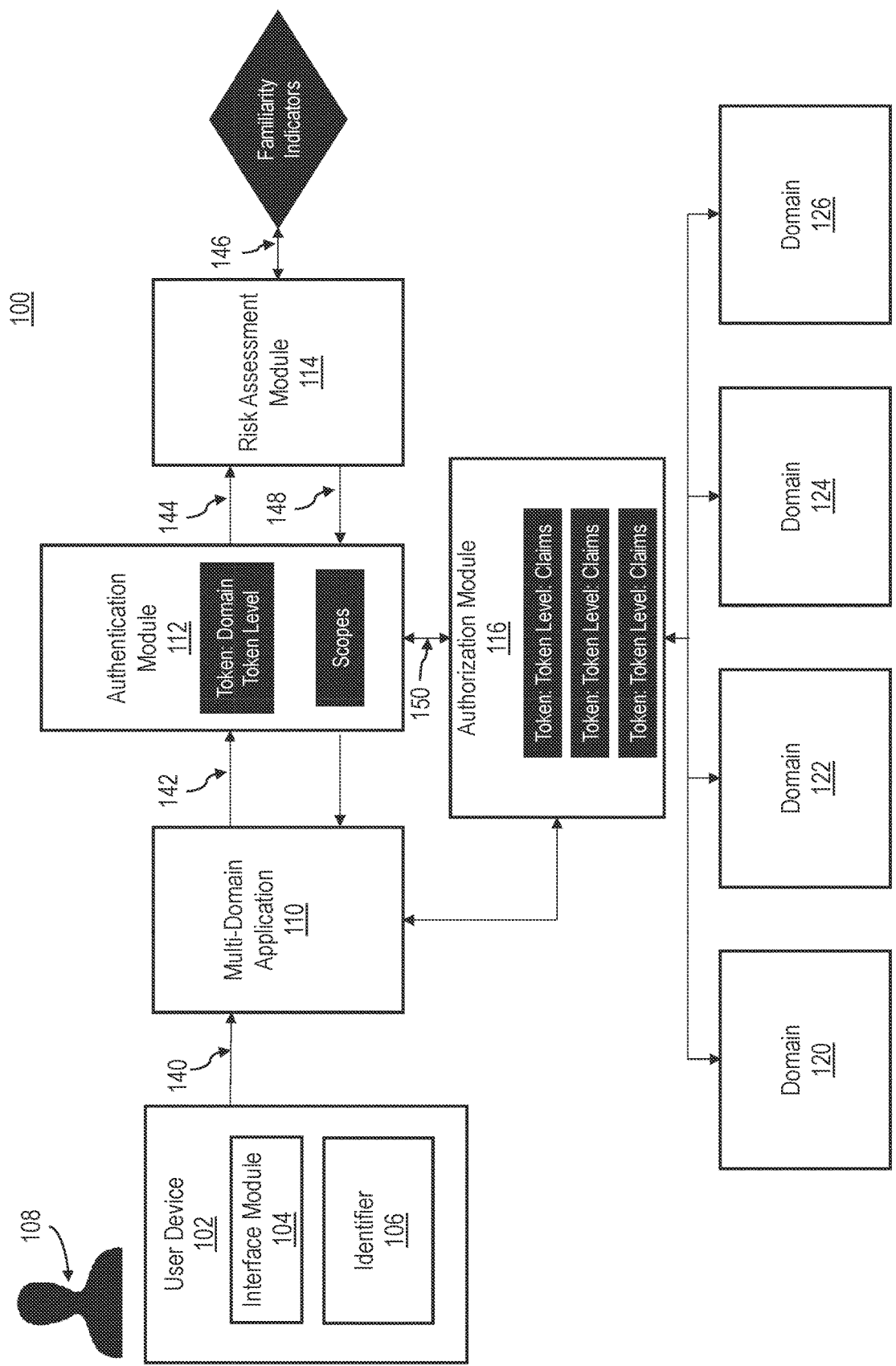
FIG. 1 is a block diagram of an example system for differentiated authorization for domains of a multi-domain application, in accordance with aspects of this disclosure.

A system and/or platform, such as a banking-as-a-service (BaaS) platform, a software-as-a-service (SaaS) platform, a financial technology (FinTech) platform, an infrastructure-as-a-service (IaaS) platform, a platform-as-a-service (PaaS) platform, and/or the like, may include, implement, and/or support a multi-domain application. The systems, methods, and computer program products described herein enable and/or facilitate differentiated authorization for domains of a multi-domain application and/or the like by separating a user and/or user device authorization mechanism, such as an authorization token, into multiple authorization levels. For example, each authorization token generated and/or provided to a user and/or user device may be unique, with an authorization level that only enables certain functionality/resources within a particular domain of the multi-domain application. The systems, methods, and computer program products described herein may implement access, control, and security mechanisms for the multi-domain application at various tiers, such as an authentication tier where user/device credentials are received and/or evaluated to determine token scopes (e.g., permissions, the context in which a token may act, etc.), a risk assessment tier where user/device familiarity indicators (e.g., device identifiers, location identifiers, request type indicators, etc.) are evaluated and/or assessed to determine if token scopes should be modified, an authorization tier where token claims (e.g., information asserted about a subject, user, device, etc.) may be defined and/or authorized to manage user/device privileges, and/or the like. The various tiers of the multi-domain application may implement granular constraints to control and/or limit token access, token levels, and/or token claims differently for each domain (e.g., authorization domain, etc.). For example, token scopes may limit domain and/or resource access to a user/device, despite having an advanced/high authorization level, based on a risk assessment of one or more familiarity indicators. According to some aspects of this disclosure, granular constraints may be implemented to provide isolation boundaries within the multi-domain application for security, reliability, versioning, unloading assemblies, and/or the like.

According to some aspects, a computing device (e.g., an application server, cloud-computing device, application management device, security control device, etc.) may receive a request for access to a multi-domain application. A familiarity indicator may be identified based on identity information received with the request for access to the multi-domain application. Based on a risk assessment of the familiarity indicator, an access level for the access to the multi-domain application may be identified. A request for an access token that enables access to a first domain of the multi-domain application may be authorized based on the access level. A request for an access token that enables access to a second domain, such as a domain associated with a higher access level than the first domain of the multi-domain application, may be denied based on the access level. Accordingly, the systems, methods, and computer program products described herein overcome challenges with conventional systems where authorization tokens are not differentiated according to domains and the linearity of authorization token usage across all domains causes excessive permissions to be enabled with system authorization and/or limits the ability to implement least privilege permissions as part of system authorization. These and other advantages are described herein.

FIG. 1 is a block diagram of an example system 100 for differentiated authorization for domains of a multi-domain application, according to some aspects of this disclosure. According to some aspects of this disclosure, system 100 may include and/or be a component of a business platform, a banking-as-a-service (BaaS) platform, a software-as-a-service (SaaS) platform, a financial technology (FinTech) platform, an infrastructure-as-a-service (IaaS) platform, a platform-as-a-service (PaaS) platform, and/or the like. Some of the process steps for differentiated authorization for domains of a multi-domain application are indicated by arrows 140-150.

According to some aspects of this disclosure, the system 100 may include a user device 102 which may include, for example, a computing device, a smart device, a mobile device, and/or the like. The user device 102 may include an interface module 104 for providing an interface to a user 108 to interact with the user device 102 and/or a multi-domain application 110. The interface module 104 may include any type of interface for presenting and/or receiving information to/from the user 108. For example, the interface module 104 may include a web browser, user interface, application instance, and/or the like. The interface module 104 may include any software, hardware, and/or interfaces to provide communication between the user 108 and the multi-domain application 110 (e.g., the domains 120, 122, 124, and 126, etc.).

According to some aspects of this disclosure, the user device 102 may be associated with a user identifier and/or device identifier, for example, such as identifier 106. The identifier 106 may be any identifier, token, character, string, or the like, for differentiating one user (e.g., user 108) or user device (e.g., user device 102) from another user or user device. The identifier 106 may identify a user or user device as belonging to a particular class of users or user devices. The identifier 106 may comprise information relating to the user device 102, for example, such as a manufacturer, a model or type of device, a service provider associated with the user device 102, a state of the user device 102, a locator, a label, and/or a classifier. The identifier 106 may represent other information.

According to some aspects of this disclosure, the identifier 106 may include an address element and/or a service element. The address element may include and/or provide an internet protocol address, a network address, a media access control (MAC) address, an Internet address, and/or the like. The address element may be relied upon to establish a communication session between the user device 102 and any device/component of the system 100. The address element may be used as an identifier or locator of the user device 102. The service element may include an identification of a service provider associated with the user device 102 and/or with the class of user device 102. The class of the user device 102 may be related to a type of device, a capability of a device, type of service being provided, and/or a level of service (e.g., business class, service tier, service package, etc.). The address element may be used to identify or retrieve data from the service element, or vice versa.

According to some aspects of this disclosure, the identifier 106 may be used to communicate information, such as familiarity information to the multi-domain application 110 (e.g., devices/components facilitating/supporting the multi-domain application 110, etc.) that may be used to evaluate and or assess potential risks may be associated with the user device 102, for example, when communicating with the multi-domain application 110.

According to some aspects of this disclosure, the system 100 may include, implement, facilitate, and/or support the multi-domain application 110. For example, although not shown, the multi-domain application 110 may be hosted, instantiated, provided, supported, implemented, and/or facilitated via a computing device, such as an application server, a cloud-computing device, an application management device, a security control device, and/or the like. The multi-domain application 110 may enable access to different domains (and/or applications), such as domains 120, 122, 124, and 126. For example, according to some aspects, the multi-domain application 110 may include a single sign-on (SSO) and/or a single logout (SLO) application/platform, and the domains 120, 122, 124, and 126 may include authorization domains of the multi-domain application 110—each domain with particular resources, components, and/or functions.

According to some aspects of this disclosure, as indicated by arrow 140, the multi-domain application 110, for example, a frontend of the multi-domain application 110, may receive a request for access to the multi-domain application 110 from user 108 via the user device 102. According to some aspects of this disclosure, the request may include identity information, such as login information, user/device credentials and/or identifiers, and/or the like.

According to some aspects of this disclosure, a backend of the multi-domain application 110, may be communicatively coupled with an authentication module 112. According to some aspects of this disclosure, the authentication module 112 may provide, facilitate, and/or enable authentication services to the multi-domain application 110. As indicated by arrow 142, the authentication module 112 may receive identity information included with a request to access the multi-domain application 110. The authentication module 112 may include software, hardware, and/or the like for receiving and/or evaluating the identity information included with a request to access the multi-domain application 110. The authentication module 112 may verify identity information to determine that the user device 102 (and/or the user 108) should have access to the multi-domain application 110.

According to aspects of this disclosure, verification of identity information may include, for example, checking a password entered against a username provided, determining that received biometric information corresponds to stored biometric information, verifying that a received user/device credential corresponds to a stored user/device credential, and/or the like. For example, according to some aspects of this disclosure, authentication module 112 may include and/or be in communication with an identity provider. The identity provider may verify and/or manage (e.g., store, control, etc.) identity information that may be used to generate access tokens for access to the multi-domain application 110.

According to aspects of this disclosure, an access token may be used to access electronically restricted resources, such as domains 120, 122, 124, and 126 of the multi-domain application 110 and/or the like, and/or access/enable resources, functions, and actions within specific the domains. For example, an access token may indicate a domain and token level. The indicated domain of the access token may be a domain of the multi-domain application 110 to which the access token is to enable access. The token level may be an indication of resources, functions, and actions available to the user device 102 (and/or the user 108) within a domain of the multi-domain application 110 for which the access token is prepared for.

According to aspects of this disclosure, the system 100 may include a risk assessment module 114. As indicated by arrow 144, the risk assessment module 114 may receive information received with a request to access the multi-domain application 110 and determine and/or rate a risk associated with enabling access to the multi-domain application 110. For example, as indicated by arrow 146, the risk assessment module 114 may assess a familiarity indicator, such as the identifier 106 and/or the like, received with a request to access the multi-domain application 110. A familiarity indicator may indicate to the risk assessment module 114 (and/or any other device/component of system 100) how familiar and/or recognizable a user/device requesting access to the multi-domain application 110 is to components of the multi-domain application 110. The risk assessment module 114 may assess and/or evaluate familiarity indicators and/or the like received with and/or indicated by a request to access the multi-domain application 110 to determine the probability that the system 100 might be compromised. For example, the risk assessment module 114 may determine that a request to access the multi-domain application 110 is risky and/or potentially malicious, despite a user/device providing proper credentials (identity information), if the request indicates that it originates (or is determined to originate) from an unknown device and/or an unrecognized location, or if there is an indication that multiple requests to access the multi-domain application 110 have been received within a timeframe using the same credentials.

According to aspects of this disclosure, the risk assessment module 114 may determine whether a request to access the multi-domain application 110 is to be trusted or is risky and/or potentially malicious based on any familiarity indicator and/or risk signal. The risk assessment module 114 may generate risk scores and/or classifications that indicate, by degrees, whether a request to access the multi-domain application 110 is trustworthy or risky. A high risk score may indicate that a request to access the multi-domain application 110 is significantly risky and may potentially compromise components of the multi-domain application 110. A low risk score may indicate that a request to access the multi-domain application 110 is trustworthy any access should be enabled to the multi-domain application 110 as requested and/or with minimal and/or no restriction. The risk assessment module 114 may determine a risk score for any access attempt in real-time.

According to aspects of this disclosure, users (e.g., the user 108, the user device 102, etc.) may be provided with authentication and/or access options appropriate to the score. For example, as a risk level increases, an authentication process may become stricter and more restrictive. Requests to access the multi-domain application 110 that are associated with a high risk score may cause the authentication module to request additional identify information and/or implement multi-factor authentication procedures/protocols. The risk assessment module 114 may use any risk classification scheme for assessing requests to access the multi-domain application 110.

According to aspects of this disclosure, the risk assessment module 114 may facilitate adaptive authentication where an access token is modified and/or configured to enable, support, and/or facilitate varying levels of access and/or restrictions according to an assessment of familiarity indicators. According to some aspects of this disclosure, the risk assessment module 114 may provide information, such as a risk score determined from a familiarity indicator and/or the like, that may be used to identify an access level for the access to the multi-domain application 110. For example, as indicated by arrow 146 and according to aspects of this disclosure, a risk assessment of familiarity indicators received with and/or indicated by a request to access the multi-domain application 110 may be used to define scopes for access tokens used to access the multi-domain application 110. Scopes may be used to limit the access of a party (e.g., the user 108, the user device 102, etc.) requesting access to resources within a given domain of the multi-domain application 110. Scopes may define what access privileges are being enabled and/or permitted by an access token.

According to aspects of this disclosure, the system 100 may include an authorization module 116. Conventionally, a single access token can grant varying degrees of access to multiple domains and/or APIs of a multi-domain application. Within the system 100, which enables, differentiated authorization for domains of a multi-domain application, the authorization module 116 may authorize different access tokens at different levels and each level may enable certain functionality/resources within a single domain the multi-domain application 110. A unique access token for each domain of the multi-domain application 110 may be generated and/or provided to and/or a user (e.g., the user device 102, the user 108, etc.). For example, based on an access level determined for a user (e.g., the user device 102, the user 108, et.), the authorization module 116 may authorize a request for an access token that enables access to a first domain of the multi-domain application 110, such as the domain 120. The authorization module 116 may deny a request for an access token that enables access to a second domain of the multi-domain application 110 that may be at a higher access level, such as the domain 122 and/or the like.

For example, according to aspects of this disclosure, as indicated by arrow 150, the authorization module 116 may authorize various claims for different access tokens defined by scopes. According to aspects of this disclosure, a user (e.g., the user device 102, the user 108, et.) may be enabled access to one or many resources of a domain of the multi-domain application 110 based on an access level and claims of an access token. Claims may identify a token type as well as any token generation and signing algorithms used. Claims may identify a token issuer, an intended recipient of the token, authentication information, temporal constraints (e.g., a time before which the token should not be accepted for processing, an expiration period, etc.) associated with a token, the subject of a token, resources privileges, and/or the like.

According to aspects of this disclosure, a user (e.g., the user device 102, the user 108, et.) may be enabled varied and/or different levels of access to different domains of a multi-domain application based on a token. For example, a user (e.g., the user device 102, the user 108, et.) may be enabled full access to a first type of domain and only partial access to a second type of domain based on a token. For example, the first type of domain may be a low-security and/or partially secured domain and the second type of domain may be a high-security and/or fully secured domain.

Figure 2:
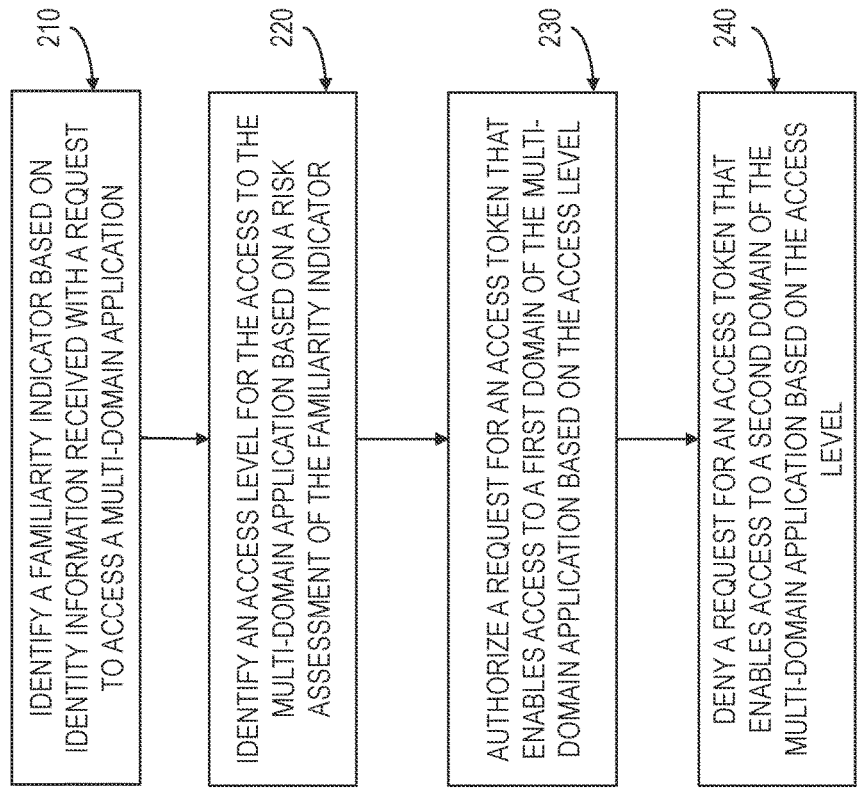
FIG. 2 shows an example method for differentiated authorization for domains of a multi-domain application, in accordance with aspects of this disclosure.

FIG. 2 shows an example computer-implemented method 200 for differentiated authorization for domains of a multi-domain application, according to some aspects of this disclosure. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 2, as will be understood by a person of ordinary skill in the art. Method 200 shall be described with regard to elements of FIG. 1 and can be performed by a computing device (and/or a collection of computing devices), such as an application server, a cloud-computing device, an application management device, a security control device, and/or the like that host, instantiate, provide, support, implement, and/or facilitate the multi-domain application 110 of FIG. 1. However, method 200 is not limited to the specific aspects depicted in FIG. 1 and other systems can be used to perform the method as will be understood by those skilled in the art.

In 210, a computing device identifies a familiarity indicator. For example, the computing device may identify a familiarity indicator based on identity information received with a request for access to a multi-domain application. The familiarity indicator may include, for example, an indication of a device type associated with the request for access to the multi-domain application, an indication of a location associated with the request for access to the multi-domain application, an indication of a temporal element associated with the request for access to the multi-domain application, an identifier of a device associated with the request for access to the multi-domain application, and/or the like.

In 220, the computing device identifies an access level for the access to the multi-domain application. For example, the computing device may identify an access level for the access to the multi-domain application based on a risk assessment of the familiarity indicator.

In 230, the computing device authorizes a request for an access token that enables access to a first domain of the multi-domain application. For example, the computing device may authorize a request for an access token that enables access to the first domain of the multi-domain application based on the access level.

In 240, the computing device denies a request for an access token that enables access to a second domain of the multi-domain application. The computing device may deny a request for an access token that enables access to the second domain of the multi-domain application based on the access level. For example, the second domain may be associated with a higher access level than the first domain. According to aspects of this disclosure, a least one of the first domain or the second domain may facilitate at least one of electronic banking, access to a digital wallet, cryptocurrency transactions, or management of non-fungible tokens.

According to some aspects of this disclosure, the method 200 may further include authorizing a request for an access token that enables access to a third domain of the multi-domain application. For example, the computing device may authorize a request for an access token that enables access to the third domain of the multi-domain application based on the access level. For example, the third domain may be associated with at least one of an equivalent access level as the first domain or a lower access level than the first domain.

According to some aspects of this disclosure, the method 200 may further include modifying the access level. For example, the computing device may modify the access level based on a risk assessment of another familiarity indicator. Another access token that enables access to the first domain to enable access to a first resource of the first domain may be authorized based on the modified access level. Based on the modified access level, the access token that enables access to the first domain may be prevented from enabling access to a second resource of the first domain.

According to some aspects of this disclosure, the method 200 may further include receiving a request for an access token that enables access to another domain of the multi-domain application. For example, the computing device may receive a request for an access token that enables access to another domain of the multi-domain application. The computing device may request additional identity information, for example, based on a risk assessment of another familiarity indicator. The computing device may authorize the request for the access token that enables access to the another domain based on receiving the additional identity information.

Figure 3:
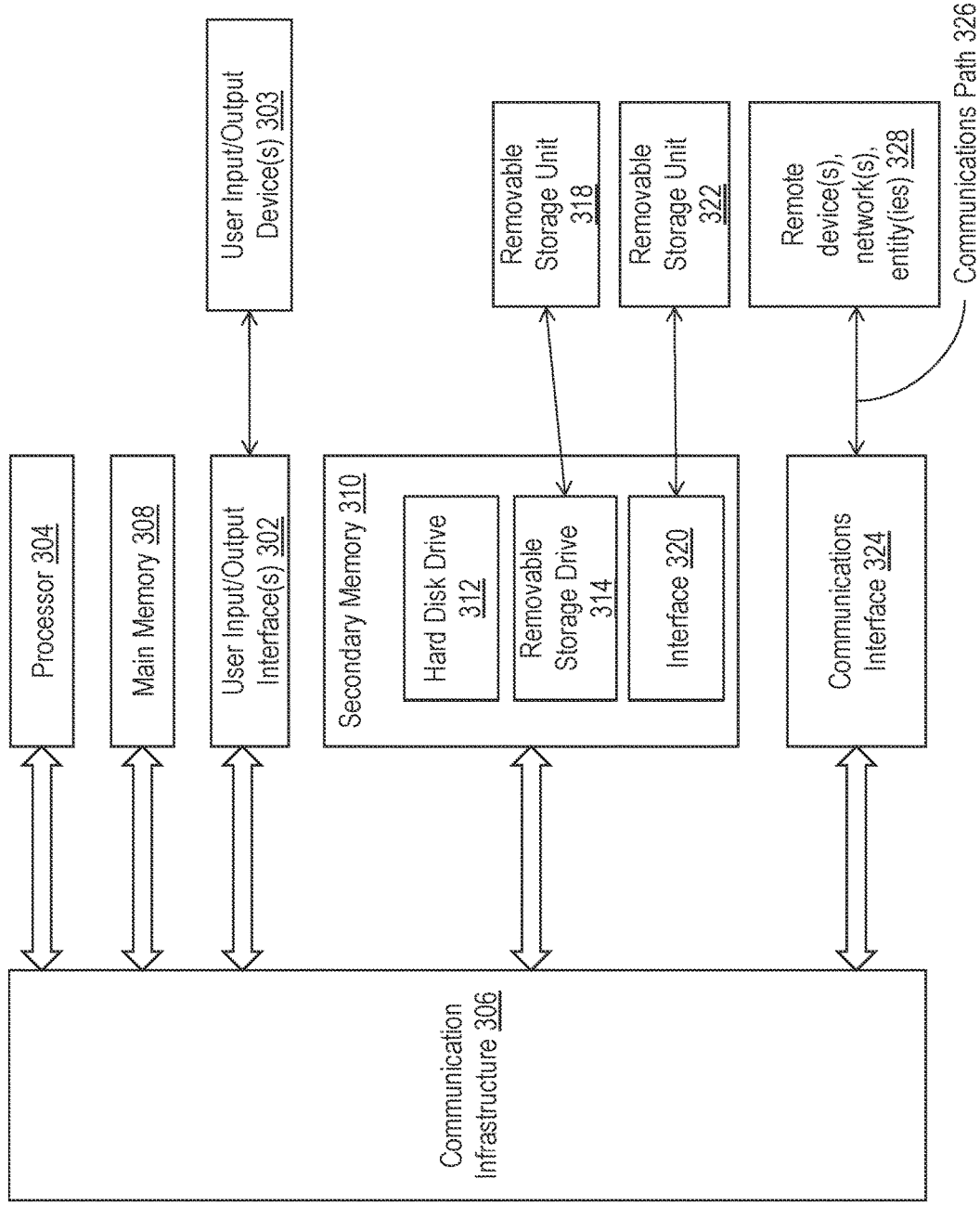
FIG. 3 is an example computer system useful for implementing various aspects disclosed herein.

Various aspects of this disclosure can be implemented, for example, using one or more computer systems, such as computer system 300 shown in FIG. 3. Computer system 300 can be used, for example, to implement any method (e.g., the method 200, etc.) described herein. Computer system 300 can be any computer capable of performing the functions described herein.

Computer system 300 can be any well-known computer capable of performing the functions described herein.

Computer system 300 includes one or more processors (also called central processing units, or CPUs), such as a processor 304. Processor 304 is connected to a communication infrastructure 306 (a bus, etc.).

One or more processors 304 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 can include one or more levels of cache. Main memory 308 has stored therein control logic (e.g., computer software) and/or data.

Computer system 300 can also include one or more secondary storage devices or memory 310. Secondary memory 310 can include, for example, a hard disk drive 312 and/or a removable storage device or drive 314. Removable storage drive 314 can be a floppy disk drive, a magnetic tape drive, a compact disk drive, an optical storage device, tape backup device, and/or any other storage device/drive.

Removable storage drive 314 can interact with a removable storage unit 318. Removable storage unit 318 includes a computer usable or readable storage device having stored thereon computer software (control logic) and/or data. Removable storage unit 318 can be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 can include other means, instrumentalities or other approaches for allowing computer programs and/or other instructions and/or data to be accessed by computer system 300. Such means, instrumentalities, or other approaches can include, for example, a removable storage unit 322 and an interface 320. Examples of the removable storage unit 322 and the interface 320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 can further include a communication or network interface 324. Communication interface 324 enables computer system 300 to communicate and interact with any combination of remote devices, remote networks, remote entities, etc. (individually and collectively referenced by reference number 328). For example, communication interface 324 can allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method comprising:
    identifying, based on identity information received with a request for access to a multi-domain application, a familiarity indicator;
    identifying, based on a risk assessment of the familiarity indicator, an access level for the access to the multi-domain application;
    authorizing, based on the access level, a request for an access token that enables access to a first domain of the multi-domain application; and
    denying, based on the access level, a request for an access token that enables access to a second domain of the multi-domain application, wherein the second domain is associated with a higher access level than the first domain.

2. The method of claim 1, wherein the familiarity indicator comprises at least one of: an indication of a device type associated with the request for access to the multi-domain application, an indication of a location associated with the request for access to the multi-domain application, an indication of a temporal element associated with the request for access to the multi-domain application, or an identifier of a device associated with the request for access to the multi-domain application.

3. The method of claim 1, wherein at least one of the first domain or the second domain facilitates at least one of: electronic banking, access to a digital wallet, cryptocurrency transactions, or management of non-fungible tokens.

4. The method of claim 1, further comprising authorizing, based on the access level, a request for an access token that enables access to a third domain of the multi-domain application, wherein the third domain is associated with at least one of an equivalent access level as the first domain or a lower access level than the first domain.

5. The method of claim 1, further comprising:
    modifying, based on a risk assessment of another familiarity indicator, the access level;
    authorizing, based on the modified access level, the access token that enables access to the first domain to enable access to a first resource of the first domain; and
    preventing, based on the modified access level, the access token that enables access to the first domain from enabling access to a second resource of the first domain.

6. The method of claim 1, further comprising:
    receiving a request for an access token that enables access to another domain of the multi-domain application;
    requesting, based on a risk assessment of another familiarity indicator, additional identity information; and
    authorizing, based on the additional identity information, the request for the access token that enables access to the another domain.

7. The method of claim 1, wherein the request for the access to the multi-domain application comprises at least one of a single sign-on (SSO) request or a single logout (SLO) request.

8. A non-transitory computer-readable medium having instructions stored thereon that, when executed by at least one computing device, cause the at least one computing device to perform operations comprising:
    identifying, based on identity information received with a request for access to a multi-domain application, a familiarity indicator;
    identifying, based on a risk assessment of the familiarity indicator, an access level for the access to the multi-domain application;
    authorizing, based on the access level, a request for an access token that enables access to a first domain of the multi-domain application; and
    denying, based on the access level, a request for an access token that enables access to a second domain of the multi-domain application, wherein the second domain is associated with a higher access level than the first domain.

9. The non-transitory computer-readable medium of claim 8, wherein the familiarity indicator comprises at least one of: an indication of a device type associated with the request for access to the multi-domain application, an indication of a location associated with the request for access to the multi-domain application, an indication of a temporal element associated with the request for access to the multi-domain application, or an identifier of a device associated with the request for access to the multi-domain application.

10. The non-transitory computer-readable medium of claim 8, wherein at least one of the first domain or the second domain facilitates at least one of: electronic banking, access to a digital wallet, cryptocurrency transactions, or management of non-fungible tokens.

11. The non-transitory computer-readable medium of claim 8, further comprising authorizing, based on the access level, a request for an access token that enables access to a third domain of the multi-domain application, wherein the third domain is associated with at least one of an equivalent access level as the first domain or a lower access level than the first domain.

12. The non-transitory computer-readable medium of claim 8, further comprising:
modifying, based on a risk assessment of another familiarity indicator, the access level;
authorizing, based on the modified access level, the access token that enables access to the first domain to enable access to a first resource of the first domain; and
preventing, based on the modified access level, the access token that enables access to the first domain from enabling access to a second resource of the first domain.

13. The non-transitory computer-readable medium of claim 8, further comprising:
receiving a request for an access token that enables access to another domain of the multi-domain application;
requesting, based on a risk assessment of another familiarity indicator, additional identity information; and
authorizing, based on the additional identity information, the request for the access token that enables access to the another domain.

14. The non-transitory computer-readable medium of claim 8, wherein the request for the access to the multi-domain application comprises at least one of a single sign-on (SSO) request or a single logout (SLO) request.

15. A system comprising:
a memory; and
at least one processor coupled to the memory and configured to perform operations comprising:
identifying, based on identity information received with a request for access to a multi-domain application, a familiarity indicator;
identifying, based on a risk assessment of the familiarity indicator, an access level for the access to the multi-domain application;
authorizing, based on the access level, a request for an access token that enables access to a first domain of the multi-domain application; and
denying, based on the access level, a request for an access token that enables access to a second domain of the multi-domain application, wherein the second domain is associated with a higher access level than the first domain.

16. The system of claim 15, wherein the familiarity indicator comprises at least one of: an indication of a device type associated with the request for access to the multi-domain application, an indication of a location associated with the request for access to the multi-domain application, an indication of a temporal element associated with the request for access to the multi-domain application, or an identifier of a device associated with the request for access to the multi-domain application.

17. The system of claim 15, wherein at least one of the first domain or the second domain facilitates at least one of: electronic banking, access to a digital wallet, cryptocurrency transactions, or management of non-fungible tokens.

18. The system of claim 15, further comprising authorizing, based on the access level, a request for an access token that enables access to a third domain of the multi-domain application, wherein the third domain is associated with at least one of an equivalent access level as the first domain or a lower access level than the first domain.

19. The system of claim 15, further comprising:
modifying, based on a risk assessment of another familiarity indicator, the access level;
authorizing, based on the modified access level, the access token that enables access to the first domain to enable access to a first resource of the first domain; and
preventing, based on the modified access level, the access token that enables access to the first domain from enabling access to a second resource of the first domain.

20. The system of claim 15, further comprising:
receiving a request for an access token that enables access to another domain of the multi-domain application;
requesting, based on a risk assessment of another familiarity indicator, additional identity information; and
authorizing, based on the additional identity information, the request for the access token that enables access to the another domain.

* * * * *